United States Patent
Kironn et al.

(10) Patent No.: US 10,739,005 B2
(45) Date of Patent: Aug. 11, 2020

(54) COOLED FUEL INJECTOR SYSTEM FOR A GAS TURBINE ENGINE

(71) Applicant: UNITED TECHNOLOGIES CORPORATION, Hartford, CT (US)

(72) Inventors: Lexia Kironn, Rocky Hill, CT (US); Roger O Coffey, Glastonbury, CT (US); Wendell V Twelves, Glastonbury, CT (US); Gary A Schirtzinger, Glastonbury, CT (US); Joe Ott, Enfield, CT (US); Evan Butcher, Windsor Locks, CT (US); John D Frish, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 822 days.

(21) Appl. No.: 14/912,117

(22) PCT Filed: Aug. 14, 2014

(86) PCT No.: PCT/US2014/051096
§ 371 (c)(1),
(2) Date: Feb. 15, 2016

(87) PCT Pub. No.: WO2015/023863
PCT Pub. Date: Feb. 19, 2015

(65) Prior Publication Data
US 2016/0201917 A1    Jul. 14, 2016

Related U.S. Application Data

(60) Provisional application No. 61/866,696, filed on Aug. 16, 2013.

(51) Int. Cl.
*F02C 7/18*    (2006.01)
*F23R 3/28*    (2006.01)
(Continued)

(52) U.S. Cl.
CPC ............. *F23R 3/283* (2013.01); *F02C 7/18* (2013.01); *F02C 7/222* (2013.01); *F23K 5/14* (2013.01);
(Continued)

(58) Field of Classification Search
CPC .. F23R 3/283; F02C 7/18; F02C 7/222; F23K 2301/20
See application file for complete search history.

(56) References Cited

U.S. PATENT DOCUMENTS 3,095,706 A    7/1963 Flanigan et al.
4,483,137 A *  11/1984 Faulkner .................. F02C 3/30
                                                        60/39.55
(Continued)

FOREIGN PATENT DOCUMENTS

EP    1908940 A2    4/2008

OTHER PUBLICATIONS

EP Extended Search Report for Appln. No. 14836084.5 dated Mar. 10, 2017.

*Primary Examiner* — Ehud Gartenberg
*Assistant Examiner* — Thomas P Burke
(74) *Attorney, Agent, or Firm* — Bachman & LaPointe, P.C.

(57) ABSTRACT

A fuel injector is provided for a gas turbine engine. The fuel injector includes a fuel conduit and a cooling fluid circuit through a strut. A gas turbine engine is provided that includes a multiple of fuel injectors in communication with a combustor and a cooling system in communication with each of the multiple of fuel injectors.

8 Claims, 8 Drawing Sheets

(51) Int. Cl.
*F23K 5/14* (2006.01)
*F23R 3/20* (2006.01)
*F02C 7/22* (2006.01)

(52) U.S. Cl.
CPC ............ *F23R 3/20* (2013.01); *F23K 2301/20* (2013.01); *Y02T 50/675* (2013.01)

(56) References Cited

U.S. PATENT DOCUMENTS

| | | |
|---|---|---|
| 5,423,178 A | 6/1995 | Mains |
| 6,109,038 A * | 8/2000 | Sharifi .................... F23C 6/042 |
| | | 431/284 |
| 6,883,332 B2 | 4/2005 | Steinthorsson et al. |
| 7,926,261 B2 * | 4/2011 | Porte ...................... B64D 13/06 |
| | | 60/226.1 |
| 2002/0073708 A1 * | 6/2002 | Lavie ...................... F23D 11/36 |
| | | 60/740 |
| 2002/0189259 A1 | 12/2002 | Laing et al. |
| 2005/0198964 A1 | 9/2005 | Myers, Jr. et al. |
| 2007/0193272 A1 * | 8/2007 | Hebert .................. F23D 11/107 |
| | | 60/740 |
| 2010/0071667 A1 * | 3/2010 | Hicks ........................ F02C 3/30 |
| | | 123/470 |
| 2012/0070271 A1 * | 3/2012 | Urban ...................... F02C 6/08 |
| | | 415/145 |
| 2012/0198852 A1 | 8/2012 | Hernandez et al. |
| 2013/0186102 A1 * | 7/2013 | Lo ............................ F02C 7/18 |
| | | 60/785 |
| 2015/0323186 A1 * | 11/2015 | Xu ........................... F02C 7/224 |
| | | 60/782 |
| 2016/0273453 A1 * | 9/2016 | Frish ........................ F02C 7/14 |

* cited by examiner

COOLED FUEL INJECTOR SYSTEM FOR A GAS TURBINE ENGINE

CROSS-REFERENCE TO RELATED APPLICATION

This application claims priority to U.S. patent application Ser. No. 61/866,696 filed Aug. 16, 2013, which is hereby incorporated herein by reference in its entirety.

BACKGROUND

The present disclosure relates to a gas turbine engine and, more particularly, to a fuel injector system therefor and method of operation thereof.

Gas turbine engines, such as those that power modern commercial and military aircraft, include a compressor section to pressurize a supply of air, a combustor section to burn a hydrocarbon fuel in the presence of the pressurized air, and a turbine section to extract energy from the resultant combustion gases and generate thrust.

The combustor section generally includes a multiple of circumferentially distributed fuel injectors that axially project into a combustion chamber to supply fuel to be mixed with the pressurized air. Gas turbine engines typically include multiple individually controlled centralized staging valves with multiple fuel supply manifolds that deliver fuel to the fuel injectors. There is one fuel supply manifold for each stage, thus, each fuel injector may have multiple fuel supply connections, one for each stage.

Each fuel injector typically has an inlet fitting connected to the manifold at the base, a strut or stem connected to the base fitting, and a nozzle tip assembly connected to the strut or stem to spray the fuel into the combustion chamber. A fuel conduit extends through the strut to supply the fuel from the inlet fitting to the nozzle tip assembly. Appropriate valves and/or flow dividers are provided to direct and control the flow of fuel through the nozzle assembly.

The nozzle assembly often includes pilot and main nozzles. Generally, the main nozzles are for normal and high power situations, while the pilot nozzles are used for start operation. The nozzles have relatively small orifices and fuel conduits in the strut which may be prone to coke formation. Coke formation may result in narrowed fuel orifices, uneven fuel burn and increased maintenance requirements.

Conventional fuel injector designs typically utilize a heat shield around the fuel injector strut to provide an insulated air gap and reduce the heat transfer rate within the diffuser case module to the fuel.

SUMMARY

A fuel injector for a gas turbine engine, according to one disclosed non-limiting embodiment of the present disclosure, includes a fuel conduit within a strut and a cooling fluid circuit within the strut.

In a further embodiment of the present disclosure, the cooling fluid circuit at least partially surrounds the fuel conduit.

In a further embodiment of any of the foregoing embodiments of the present disclosure, the cooling fluid circuit defines a helix around the fuel conduit.

In a further embodiment of any of the foregoing embodiments of the present disclosure, a support is mounted to the strut. The support includes a cooling fluid inlet in communication with the cooling fluid circuit and a fluid cooling outlet in communication with the cooling fluid circuit.

In a further embodiment of any of the foregoing embodiments of the present disclosure, the support is operable to mount the strut to a diffuser case module.

A gas turbine engine, according to another disclosed non-limiting embodiment of the present disclosure, includes a multiple of fuel injectors in communication with the combustor and a cooling system in communication with each of the multiple of injectors.

In a further embodiment of any of the foregoing embodiments of the present disclosure, a diffuser case module is included. The multiple of fuel injectors are mounted to the diffuser case module.

In a further embodiment of any of the foregoing embodiments of the present disclosure, the cooling system includes a cooling fluid manifold in communication with each of the multiple of fuel injectors.

In a further embodiment of any of the foregoing embodiments of the present disclosure, the cooling fluid manifold is a circular internal split manifold with an intake plenum and an exhaust plenum separated by a barrier.

In a further embodiment of any of the foregoing embodiments of the present disclosure, the intake plenum and the exhaust plenum communicate with each of the multiple of fuel injectors.

In a further embodiment of any of the foregoing embodiments of the present disclosure, an inlet passage is included in communication with the cooling fluid manifold.

In a further embodiment of any of the foregoing embodiments of the present disclosure, a heat exchanger is included and operatively associated with the inlet passage for reducing temperature of fluid flowing in the inlet passage.

In a further embodiment of any of the foregoing embodiments of the present disclosure, an inlet scoop is included to direct a portion of a bypass airflow into the inlet passage.

In a further embodiment of any of the foregoing embodiments of the present disclosure, the inlet scoop is located through a core nacelle axially upstream of a throat region between the core nacelle and a fan nacelle.

In a further embodiment of any of the foregoing embodiments of the present disclosure, an inlet passage is included in communication with the cooling fluid manifold and a compressor section of the gas turbine engine.

In a further embodiment of any of the foregoing embodiments of the present disclosure, an inlet passage is included in communication with the cooling fluid manifold and a 2.5 bleed compartment.

In a further embodiment of any of the foregoing embodiments of the present disclosure, an exhaust passage is included in communication with the cooling fluid manifold.

In a further embodiment of any of the foregoing embodiments of the present disclosure, an exhaust is included from the exhaust passage located through a core nacelle axially downstream of a throat region between the core nacelle and a fan nacelle.

A method of minimizing coking within a gas turbine engine fuel injector, according to another disclosed non-limiting embodiment of the present disclosure, includes communicating a cooling fluid through a strut of each of a multiple of fuel injectors.

In a further embodiment of any of the foregoing embodiments of the present disclosure, the method includes communicating bypass air as the cooling fluid.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
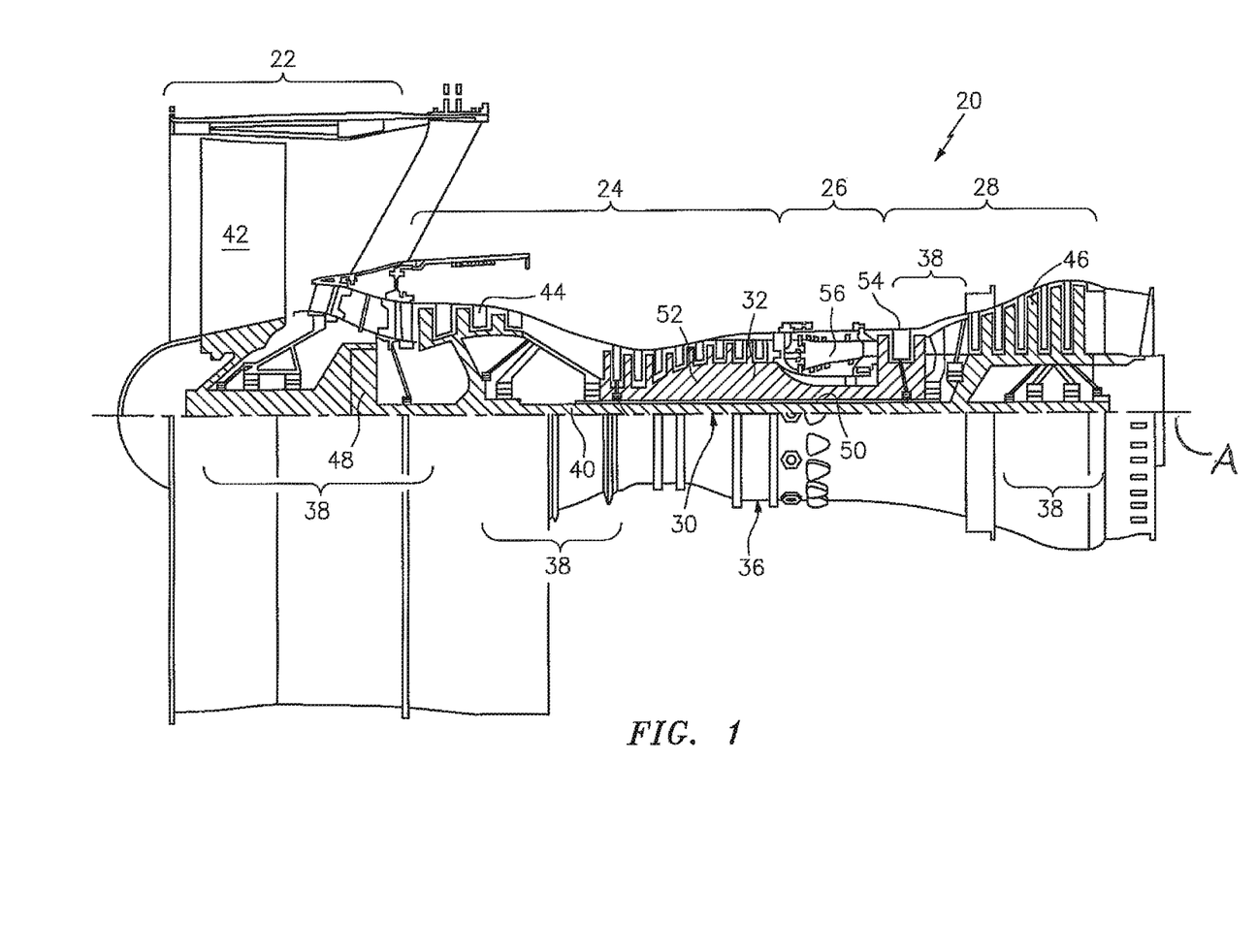
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air into the compressor section 24 and along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines, for example, but not limited to, a three-spool (plus fan) engine wherein an intermediate spool includes an intermediate pressure compressor (IPC) between a low pressure compressor (LPC) and a high pressure compressor (HPC) and an intermediate pressure turbine (IPT) between a high pressure turbine (HPT) and a low pressure turbine (LPT).

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 (see FIG. 1) to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded through the HPT 54 and LPT 46. The LPT 46 and HPT 54 rotationally drive the respective low spool 30 and high spool 32 in response to the expansion.

In one non-limiting example, the gas turbine engine 20 is a high-bypass geared architecture aircraft turbofan engine with a bypass ratio greater than about six (6:1). The example geared architecture 48 provides a gear reduction ratio of greater than about 2.3:1, and in another example is greater than about 2.5:1. The geared turbofan enables operation of the low spool 30 at higher speeds which can increase the operational efficiency of the LPC 44 and LPT 46 to render increased pressure ratios in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

A significant amount of thrust is provided by the bypass flow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of "Tram"/$518.7^{0.5}$. The Low Corrected Fan Tip Speed according to one non-limiting embodiment of the example gas turbine engine 20 is less than about 1150 fps (351 m/s).

Figure 2:
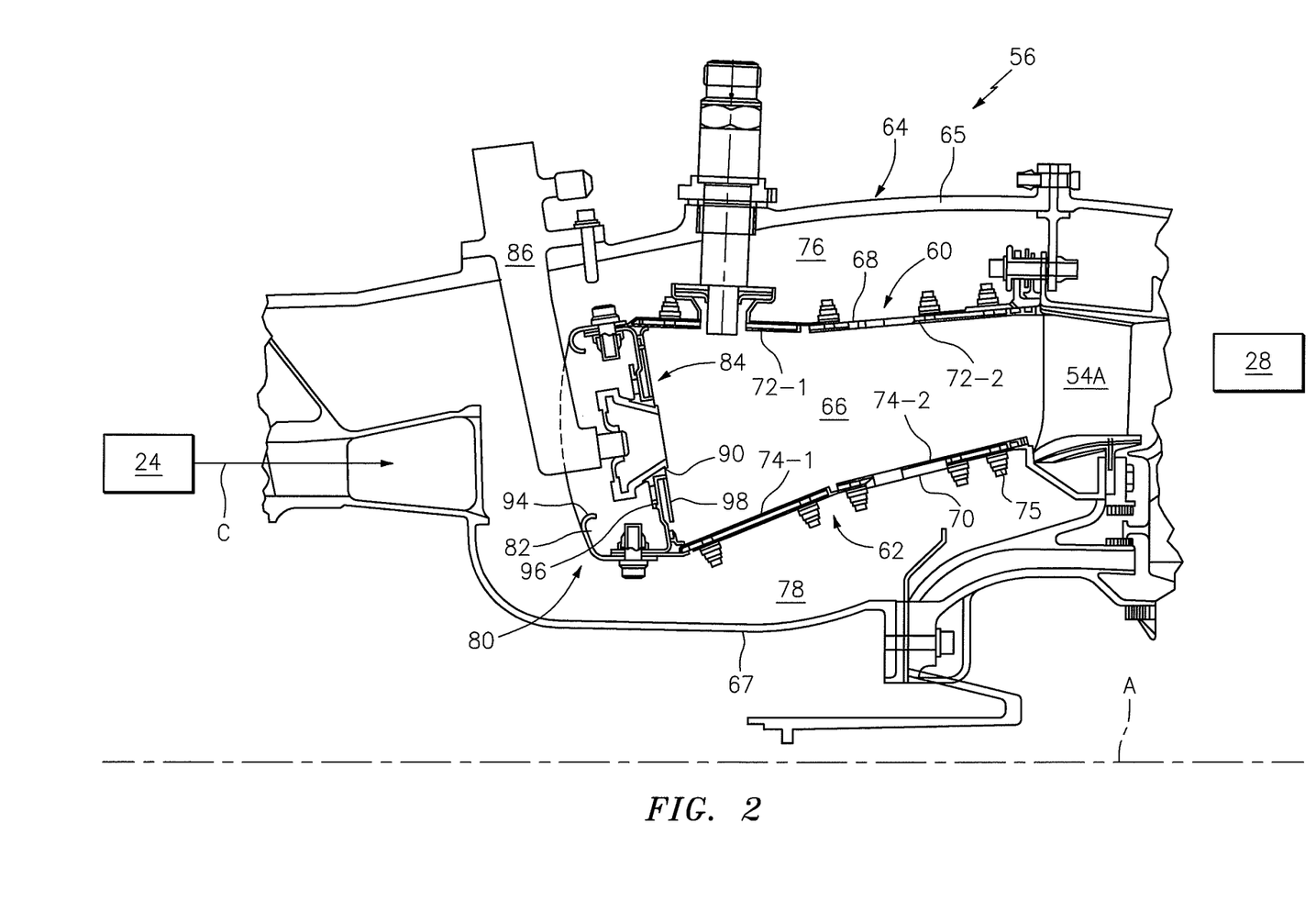
FIG. 2 is a partial longitudinal schematic sectional view of a combustor section according to one non-limiting embodiment that may be used with the gas turbine engine shown in FIG. 1.

With reference to FIG. 2, the combustor 56 generally includes an outer liner 60, an inner liner 62 and a diffuser case module 64. The outer liner 60 and the inner liner 62 are spaced apart such that a combustion chamber 66 is defined therebetween. The combustion chamber 66 is generally annular in shape. The outer liner 60 is spaced radially inward from an outer diffuser case 65 of the diffuser case module 64 to define an annular outer plenum 76. The inner liner 62 is spaced radially outward from an inner diffuser case 67 of the diffuser case module 64 to define an annular inner plenum 78. It should be understood that although a particular combustor is illustrated, other combustor types with various combustor liner arrangements will also benefit herefrom.

The liners 60, 62 contain the combustion products for direction toward the turbine section 28. Each liner 60, 62 generally includes a respective support shell 68, 70 which supports a multiple of heat shields 72-1, 72-2, 74-1, 74-2 which are attached to a hot side of the respective support shell 68, 70 with fasteners 75 such as with studs and nuts. In one disclosed non-limiting embodiment, the array includes a multiple of forward heat shields 72-1 and a multiple of aft heat shields 72-2 that line the hot side of the outer support shell 68 and a multiple of forward heat shields 74-1 and a multiple of aft heat shields 74-2 that line the hot side of the inner support shell 70.

The combustor 56 also includes a forward assembly 80 immediately downstream of the compressor section 24 to guide compressed airflow C therefrom. The forward assembly 80 generally includes an annular hood 82, a bulkhead assembly 84 and a multiple of swirlers 90 (one shown).

The annular hood 82 extends radially between, and in this disclosed non-limiting embodiment, is secured to, the forwardmost ends of the liners 60, 62. The multiple of circumferentially distributed hood ports 94 accommodate a respective multiple of fuel injectors 86 as well as direct compressed air into the forward end of the combustion chamber 66 through the associated swirler 90. Each fuel injector 86 may be secured to the diffuser case module 64 to project through one of the hood ports 94 and the respective swirler 90. It should be appreciated that various architectures of the forward assembly 80 will also benefit herefrom.

Each swirler 90 in this disclosed non-limiting embodiment is circumferentially aligned with its respective hood port 94 to project through the bulkhead assembly 84. The bulkhead assembly 84 includes a bulkhead support shell 96 secured to the liners 60, 62, and a multiple of circumferentially distributed bulkhead heat shields 98 secured to the bulkhead support shell 96 around each swirler 90.

The forward assembly 80 and liners 60, 62 introduce core combustion air into the forward end of the combustion chamber 66 while the remainder enters the annular outer plenum 76 and the annular inner plenum 78. The multiple of fuel injectors 86 and swirlers 90 facilitate the generation of a blended fuel-air mixture that supports combustion in the combustion chamber 66.

Opposite the forward assembly 80, the outer and inner support shells 68, 70 interface with a first row of Nozzle Guide Vanes (NGVs) 54A of the HPT 54 in this disclosed non-limiting embodiment. The NGVs 54A are located immediately downstream of the combustor 56 as the first static vane structure upstream of a first turbine rotor in the turbine section 28. The NGVs 54A are static engine components which direct core airflow combustion gases onto the turbine blades of the first turbine rotor in the turbine section 28 to facilitate the conversion of pressure energy into kinetic energy. The combustion gases are also accelerated by the NGVs 54A because of their convergent shape and typically provide a "spin" or a "swirl" in the direction of turbine rotor rotation. The turbine rotor blades absorb this energy to drive the turbine rotor.

Figure 3:
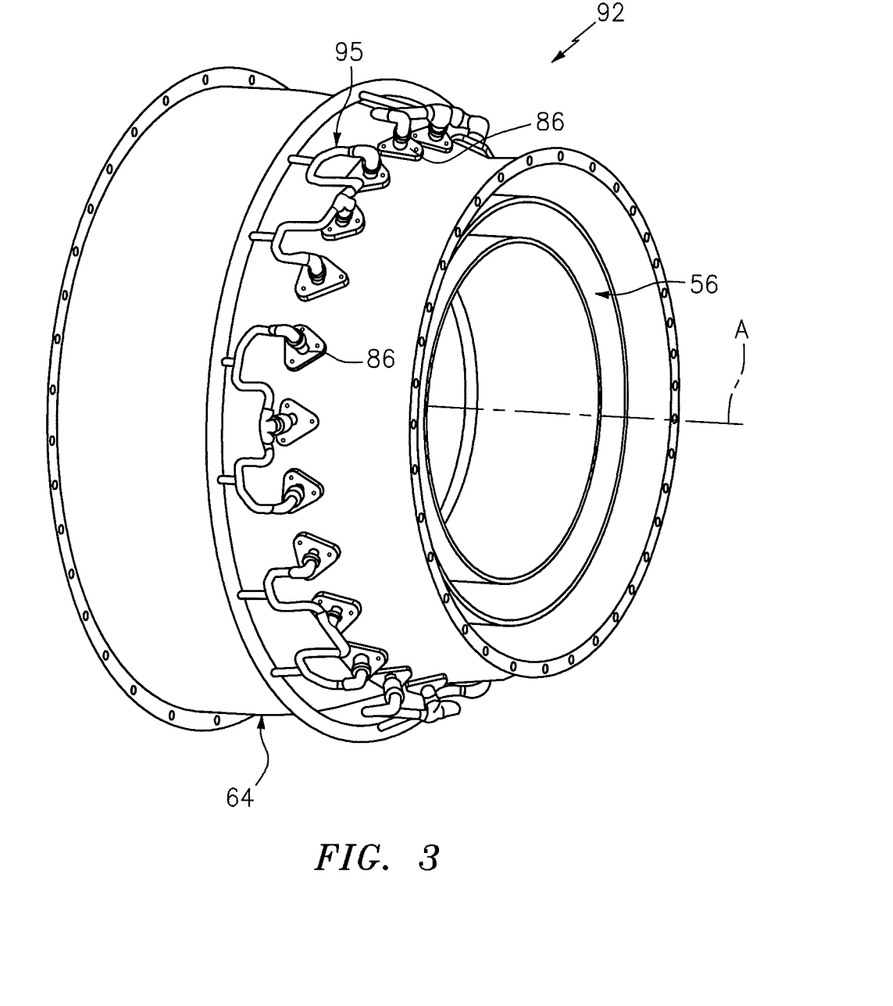
FIG. 3 is a perspective schematic isometric view of a diffuser case which shows a fuel manifold connected to a fuel injector system.

With reference to FIG. 3, a fuel injector system 92 generally includes one or more fuel injector supply manifolds 95 to which the multiple of fuel injectors 86 are connected. The fuel injector supply manifolds 95 are generally arranged circumferentially around the diffuser case module 64 to communicate fuel to the multiple of fuel injectors 86 which project into the annular combustor 56. It should be appreciated that various fuel injector systems and geometries will benefit herefrom.

Figure 4:
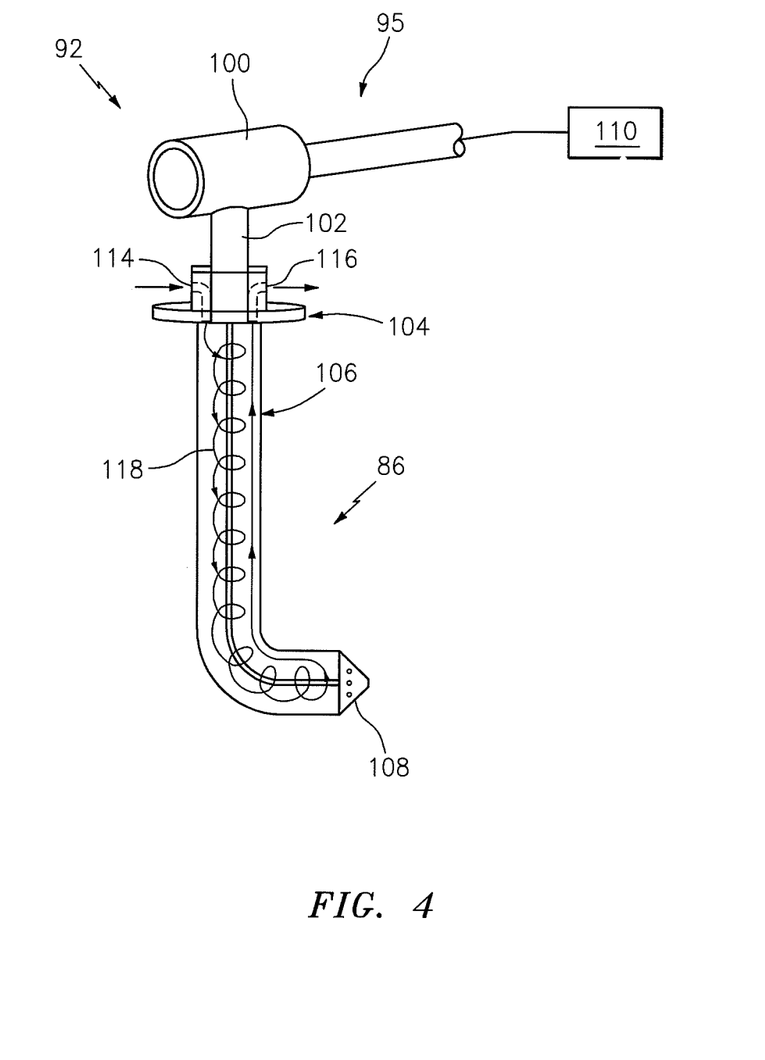
FIG. 4 is schematic view of a fuel injector according to one disclosed non-limiting embodiment.

With reference to FIG. 4, each of the multiple of fuel injectors 86 generally includes a valve 100, a fuel conduit 102, a support 104, a strut 106 and a nozzle tip 108. The fuel conduit 102 of each fuel injector 86 is in fluid communication with one, e.g., simplex, and/or more, e.g., duplex, fuel injector supply manifolds 95 (one shown schematically) of a fuel system 110 (illustrated schematically) through the respective valve 100. That is, each valve 100 may operate to selectively control fuel communication into one or more fuel circuits such as primary and secondary, within each of the multiple of fuel injectors 86 for direction through the nozzle tip 108. The nozzle tip 108 operates to spray the fuel into the combustor chamber 66 through the swirler 90.

With continued reference to FIG. 4, the support 104 mounts the strut 106 to the diffuser case module 64 to radially locate the fuel injector 86 with respect to the combustion chamber 66. The support 104 may be fastened or otherwise attached to the diffuser case module 64 to orient the strut 106. The strut 106 operates to at least partially thermally protect the fuel injector fuel circuits from the combustor environment which, since located within the diffuser case module 64, may be exposed to about 1150 F (621 C).

The support 104 defines a cooling fluid inlet 114 and a cooling fluid outlet 116 for a cooling fluid circuit 118 within the strut 106. That is, the cooling fluid circuit 118 thermally interacts with the fuel conduit 102 within the strut 106 to manage the fuel conduit 102 wetted wall temperatures to within acceptable limits and thereby minimize—if not prevent—fuel coke deposition and resultant performance degradation of the combustor 56 along the length of the strut 106 to the nozzle tip 108. In one example, the acceptable wetted wall limits are about 350 F (177 C). It should be appreciated that various cooling fluid circuit 118 geometries and flow directions such as, but not limited to, helical, may be utilized within the strut 106. That is, the cooling fluid circuit 118 may define various paths within the strut 106. The strut 106 and cooling fluid circuit 118 may be readily manufactured, for example, via an additive manufacturing process such as powder bed metallurgy, direct metal laser sintering, electron beam melting or other.

Figure 5:
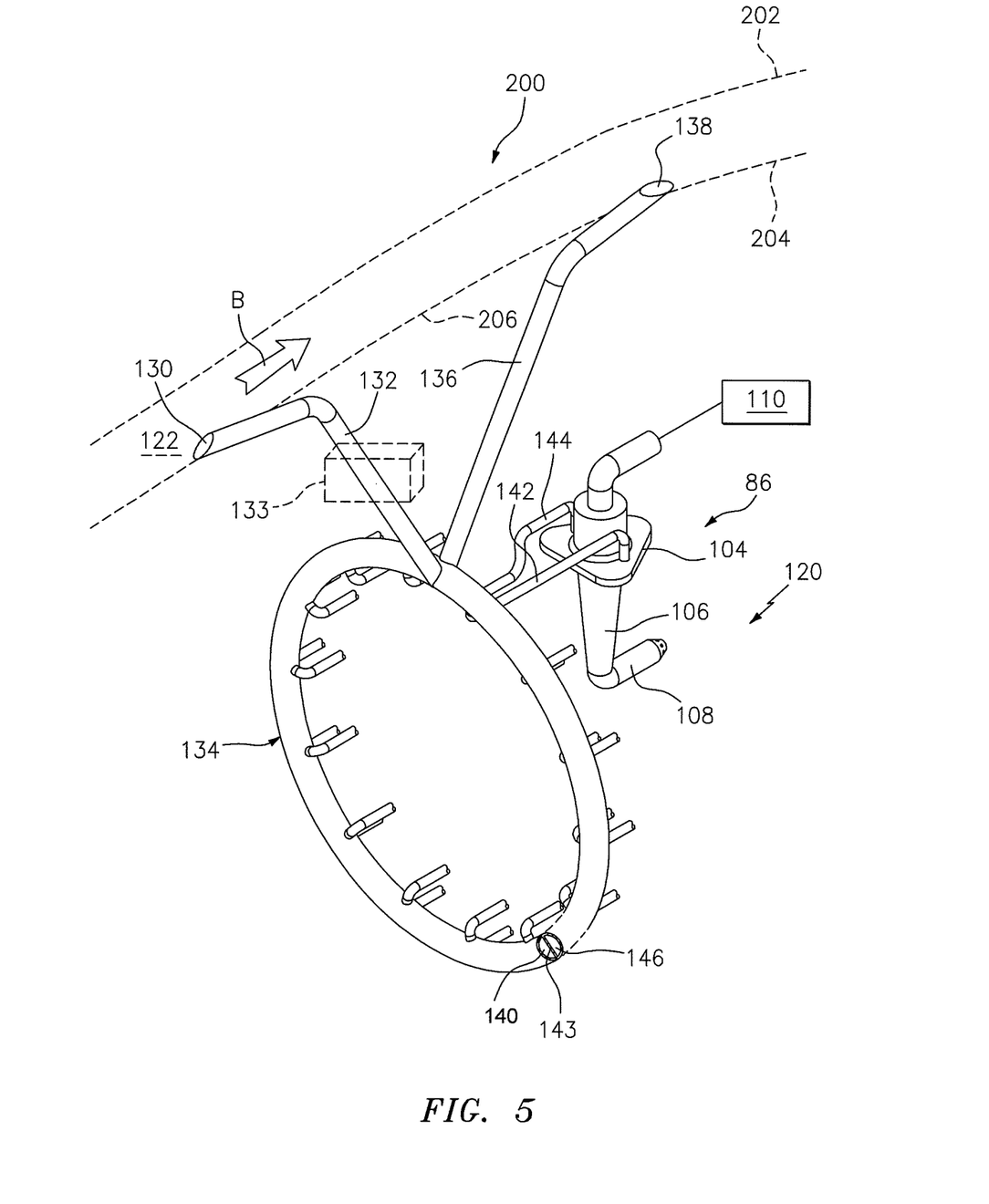
FIG. 5 is partial perspective view of a cooling system for use with a multiple of fuel injectors according to one disclosed non-limiting embodiment.

With reference to FIG. 5, a cooling system 120 communicates a cooling fluid to each cooling fluid circuit 118 within each strut 106. It should be appreciated that the cooling system 120 may be of various fluid and other types to include, but not be limited to, air, liquid, and other cooling media.

Figure 6:
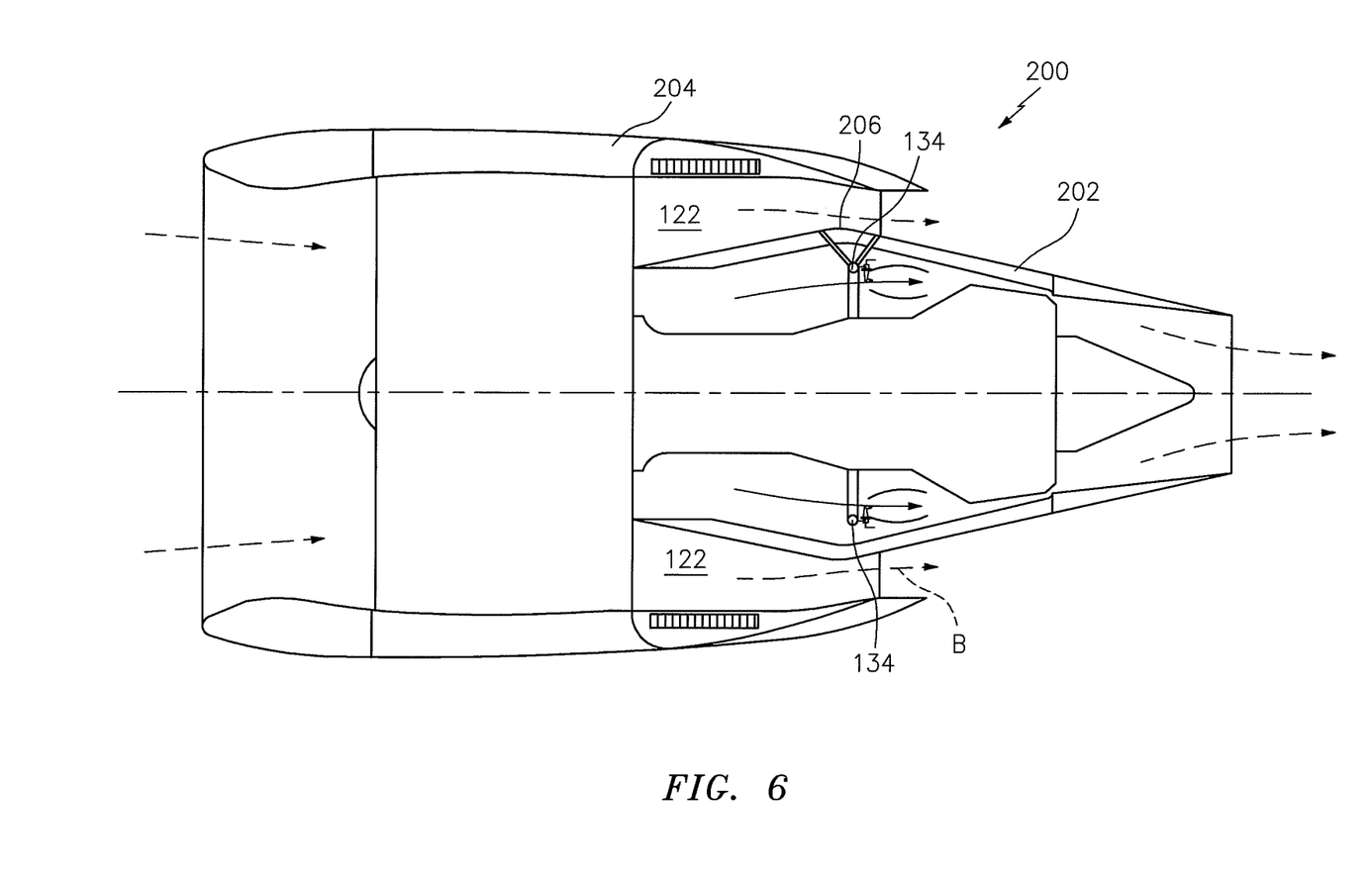
FIG. 6 is schematic view of a nacelle assembly with the cooling system according to one disclosed non-limiting embodiment.

In one disclosed non-limiting embodiment, the cooling system 120 utilizes bypass airflow B from within a bypass flowpath 122 of a nacelle assembly 200 (also shown in FIG. 6). The nacelle assembly 200 generally includes a core nacelle 202 at least partially surrounded by a fan nacelle 204 to define the generally annular bypass flowpath 122.

Figure 7:
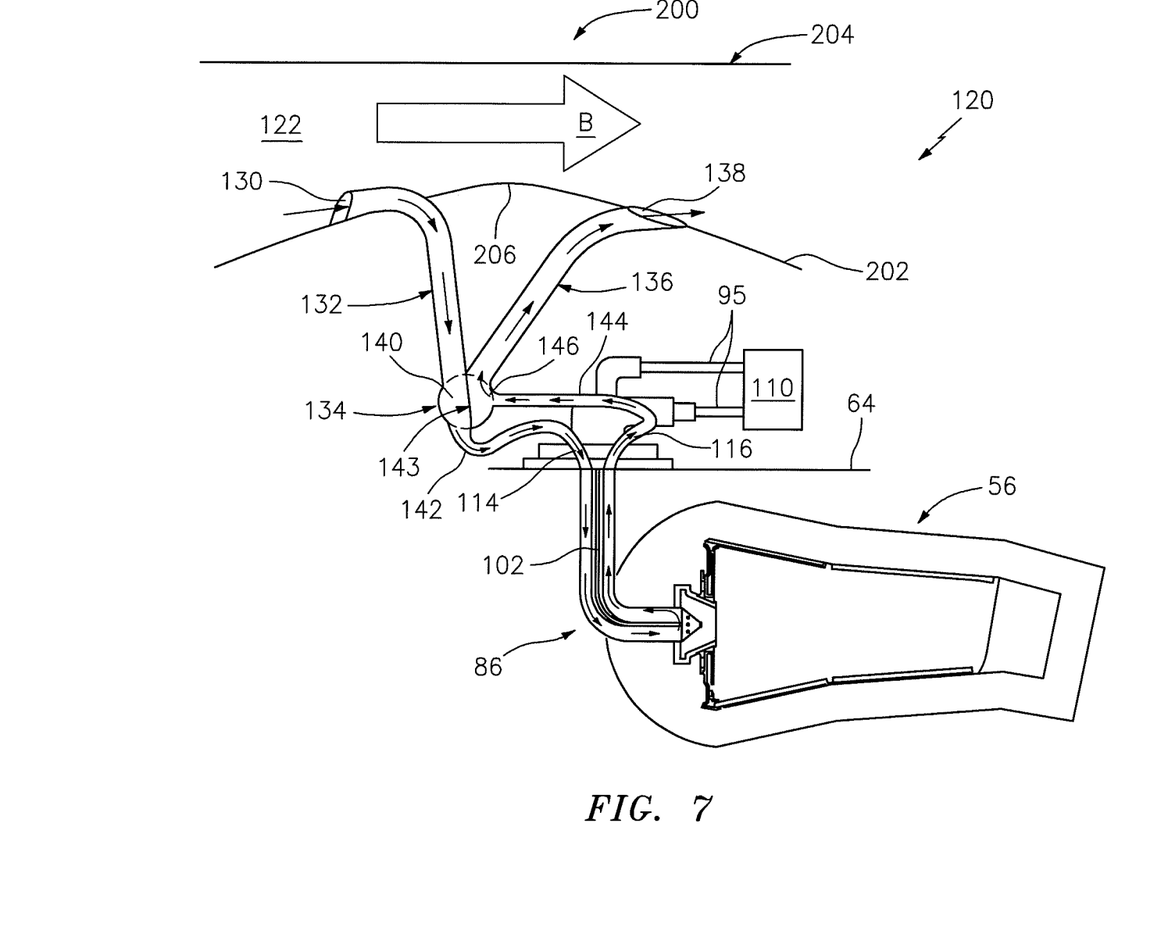
FIG. 7 is a schematic view of the cooling system according to one disclosed non-limiting embodiment.

The cooling system 120 generally includes an inlet scoop 130, an inlet passage 132, a cooling fluid manifold 134, an exhaust passage 136 and an exhaust outlet 138. The inlet scoop 130 is located through the core nacelle 202 axially upstream of a throat region 206 between the core nacelle 202 and the fan nacelle 204 to direct a portion of the bypass airflow into the inlet scoop 130 (best seen in FIG. 7). The portion of bypass airflow B from the inlet scoop 130 is thereby communicated to the cooling fluid manifold 134 through the inlet passage 132.

With continued reference to FIG. 5, in another disclosed non-limiting embodiment, a heat exchanger 133 (illustrated schematically) in fluid communication with the inlet passage 132 may additionally be provided to further reduce the temperature of the bypass airflow B in the inlet passage 132.

It should be appreciated that various types of heat exchangers such as fluid-air; air-air, laser cooling and others may be provided.

The cooling fluid manifold 134, in one disclosed non-limiting embodiment, may be a circular internal split manifold with an intake plenum 140 and an exhaust plenum 146 separated by a barrier 143. The cooling fluid manifold 134 may be located within the core nacelle 202 to distribute cooling fluid to each of the multiple of fuel injectors 86. The cooling fluid manifold 134 may, for example, be readily manufactured with an additive manufacturing process such as powder bed metallurgy, direct metal laser sintering, electron beam melting or other.

The intake plenum 140 communicates with each cooling fluid inlet 114 of each support 104 through a respective plenum exit passage 142. That is, the intake plenum 140 distributes airflow from the inlet passage 132 to each of multiple of fuel injectors 86 through the respective multiple of plenum exit passages 142. The cooling airflow from each cooling fluid circuit 118 within each strut 106 of each of the multiple of multiple of fuel injectors 86 is returned to the exhaust plenum 146 through a respective multiple of plenum inlet passages 144. That is, each cooling fluid circuit 118 within each strut 106 receives cooling airflow from the cooling fluid manifold 134 through the respective plenum exit passage 142 and returns the cooling airflow to the cooling fluid manifold 134 through respective plenum inlet passages 144. Each of the multiple of fuel injectors 86 thereby includes a respective plenum exit passage 142 in communication with the cooling fluid inlet 114 and a respective plenum inlet passage 144 in communication with the cooling fluid outlet 116.

The cooling airflow from the exhaust plenum 146 is then communicated to the exhaust outlet 138 through the exhaust passage 136. The exhaust outlet 138 is located through the core nacelle 202 axially downstream of the throat region 206 to recover the cooling airflow back into the annular bypass flowpath 122. As the exhaust outlet 138 is located axially downstream of the throat region 206, a venturi effect generates a differential pressure relative to the inlet scoop 130 to further facilitate evacuation of the cooling fluid manifold 134.

Figure 8:
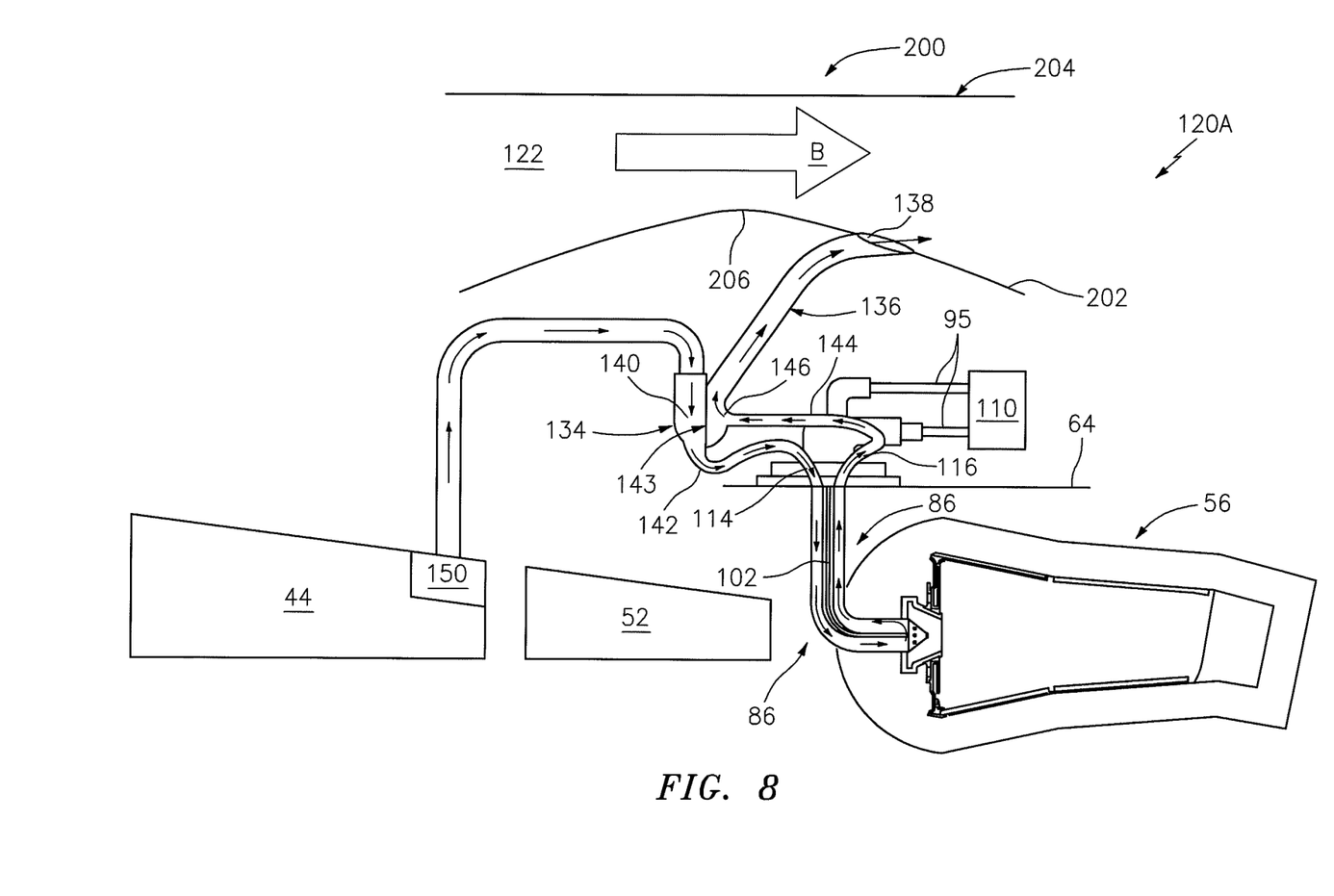
FIG. 8 is a schematic view of the cooling system according to one disclosed non-limiting embodiment.

With reference to FIG. 8, a cooling system 120A according to another disclosed non-limiting embodiment receives airflow from the compressor section 24 such as a 2.5 Bleed compartment 150 (illustrated schematically). Typically, the 2.5 bleed compartment 150 communicates through a port in the compressor section 24 that opens via a movable valve element (not shown) under low engine power conditions. Air from the of 2.5 bleed compartment 150 is typically at a temperature of about 126 F (52 C) and a pressure of about 20 psi which is relatively cool compared to the temperature within the diffuser case module 64. It should be appreciated that although a 2.5 bleed compartment 150 is illustrated in the disclosed non-limiting embodiment, various other bleed air sources may alternatively or additionally be utilized.

The multiple of fuel injectors 86 are thereby actively cooled to reduce the heat transfer rate from the relatively high temperature air within the diffuser case module 64.

It should be understood that relative positional terms such as "forward," "aft," "upper," "lower," "above," "below," and the like are with reference to the normal operational attitude and should not be considered otherwise limiting.

It should be understood that like reference numerals identify corresponding or similar elements throughout the several drawings. It should also be understood that although a particular component arrangement is disclosed in the illustrated embodiments, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
a combustor;
a multiple of fuel injectors in communication with said combustor;
a cooling fluid manifold in communication with each of said multiple of fuel injectors, said cooling fluid manifold comprising an intake plenum and an exhaust plenum separated by a barrier, wherein said intake plenum and said exhaust plenum communicates with said multiple of fuel injectors, wherein said cooling fluid manifold is a circular internal split manifold;
an inlet passage in communication with said cooling fluid manifold;
an inlet scoop to direct a portion of an airflow into said inlet passage; and
an exhaust passage in communication with said cooling fluid manifold for discharging the airflow.

2. The gas turbine engine as recited in claim 1, further comprising a diffuser case module, said multiple of fuel injectors mounted to said diffuser case module.

3. The gas turbine engine as recited in claim 1, further comprising a heat exchanger operatively associated with said inlet passage for reducing a temperature of fluid flowing in said inlet passage.

4. The gas turbine engine as recited in claim 1, wherein said airflow is a bypass airflow.

5. The gas turbine engine as recited in claim 4, wherein said inlet scoop is located through a core nacelle axially upstream of a throat region between said core nacelle and a fan nacelle.

6. The gas turbine engine as recited in claim 1, further comprising an inlet passage in communication with said cooling fluid manifold and a compressor section of said gas turbine engine.

7. The gas turbine engine as recited in claim 1, further comprising an inlet passage in communication with said cooling fluid manifold and a 2.5 bleed compartment.

8. The gas turbine engine as recited in claim 1, further comprising an exhaust from said exhaust passage located through a core nacelle axially downstream of a throat region between said core nacelle and a fan nacelle.

* * * * *